United States Patent [19]

Moore et al.

[11] Patent Number: 4,740,560

[45] Date of Patent: Apr. 26, 1988

[54] ABS RESINS AND PROCESS FOR MAKING THEM

[75] Inventors: Eugene R. Moore; Gary D. Parsons, both of Midland, Mich.; Paul C. Balliet, Granville, Ohio

[73] Assignee: The Dow Chemical Company, Midland, Mich.

[21] Appl. No.: 853,254

[22] Filed: Apr. 17, 1986

[51] Int. Cl.$^4$ .......................... C08L 9/04; C08L 9/08; C08L 51/04; C08L 55/02

[52] U.S. Cl. .......................... 525/71; 525/75; 525/80; 525/86; 525/942

[58] Field of Search .................. 525/71, 70, 86, 942, 525/78, 80, 75

[56] References Cited

U.S. PATENT DOCUMENTS

| | | | |
|---|---|---|---|
| 3,509,237 | 4/1970 | Aubrey | 525/71 |
| 3,509,258 | 4/1970 | Aubrey et al. | 525/71 |
| 3,928,495 | 12/1975 | Dalton | 525/71 |
| 4,146,589 | 3/1979 | Dupre | 525/71 |
| 4,214,056 | 7/1980 | Lavengood | 525/71 |
| 4,510,287 | 4/1985 | Wu | 525/71 |

FOREIGN PATENT DOCUMENTS

| | | | |
|---|---|---|---|
| 3304544 | 8/1984 | Fed. Rep. of Germany | 525/71 |
| 2044779 | 10/1980 | United Kingdom | 525/71 |

*Primary Examiner*—Allan M. Lieberman
*Attorney, Agent, or Firm*—Harness, Dickey & Pierce

[57] ABSTRACT

A polyblend of a high graft copolymer, a low graft copolymer and a matrix interpolymer is made by:

(A) mixing a latex of the high graft copolymer and a latex of the low graft copolymer to provide a mixture thereof;

(B) coagulating and at least partially dewatering the mixture of step (A);

(C) melt blending the mixture of step (B) to provide a first polyblend; and (D) melt blending the first polyblend of step (C) with matrix interpolymer to provide a second polyblend.

18 Claims, No Drawings

ABS RESINS AND PROCESS FOR MAKING THEM

BACKGROUND OF THE INVENTION

The present invention relates to a blend of rubber-modified resins. More particularly, the present invention relates to an improved polyblend of ABS resins and to a process for making the polyblend.

Rubber-modified resins are versatile resins characterized by a good balance of mechanical and aesthetic properties. The specific properties of rubber-modified resins can be effected by the processes by which such polymers are made. For example, processing techniques leading to large particles tend to provide increased toughness but decreased gloss while processing techniques leading to small particles tend to provide increased gloss but decreased toughness. This seems to be particularly the case where the technique involves agglomeration of small particles into larger particles.

One technique for obtaining a good balance of properties involves the making of polyblends of rubber-modified resins. Numerous polyblends of rubber-modified resins are disclosed, for example, in U.S. Pat. Nos. 4,419,492, Dec. 6, 1983 to Simon; 3,509,238, Apr. 28, 1970 to Aubrey, et al.; 3,442,979, May 6, 1969 to Ott, et al; 4,007,234, Feb. 8, 1977 to Schuddemage, et al; 3,222,422, Dec. 7, 1965 to Cohen; 3,354,108, Nov. 28, 1967 to Paradis, et al; and 3,438,971, Apr. 15, 1969 to Walker.

However, it will be appreciated that it would be desirable to provide an improved polyblend, for example, a polyblend having high gloss and a high degree of toughness. It would be especially desirable to provide such a polyblend also having high melt flow characteristics. It would also be desirable to provide a process yielding a compact product with relatively low quantities of dust and the problems associated therewith. Accordingly, it is an object of the present invention to provide an improved polyblend and process directed toward these desired characteristics. Further understanding of this invention will be had from the following disclosure wherein all parts and percentages are by weight unless otherwise indicated.

SUMMARY OF THE INVENTION

In accordance with the present invention, a polyblend of a high graft polymer, a low graft polymer and a matrix interpolymer is made by:

(A) mixing a latex of the high graft copolymer and a latex of the low graft copolymer to provide a mixture thereof;

(B) coagulating and at least partially dewatering the mixture of step (A);

(C) melt blending the mixture of step (B) to provide a first polyblend; and (D) melt blending the first polyblend of step (C) with matrix interpolymer to provide a second polyblend.

The polyblend product of the process has high gloss, high melt flow rate, and good toughness. Preferably, the graft copolymers are acrylonitrile-butadiene-styrene and the matrix copolymer is styrene-acrylonitrile copolymer.

DESCRIPTION OF THE INVENTION

The present invention relates in particular to a polyblend of a high graft copolymer, a low graft copolymer and a matrix copolymer. The high graft copolymer and low graft copolymer comprise rubber substrates onto which an interpolymer has been grafted. The polyblend is made by mixing latexes of the graft copolymers, coagulating and at least partially dewatering the mixture which is then melt blended as by extrusion. The extrudate is then melt blended with the matrix copolymer. It is believed tha by blending high graft copolymer particles and low graft copolymer particles, some of the particles become colloidally unstable and coalesce during melt blending as by extrusion to yield a desirable particle size distribution. Thus, in accordance with the present invention, a resin blend having excellent gloss, toughness, and melt flow characteristics is obtained.

The High Graft Copolymer

Graft copolymers are well known in the art as are various methods for their making in latex form. Generally speaking, a latex of a graft copolymer can be made by polymerizing a rubber or elastomeric core and then grafting a thin outer layer of a rigid phase interpolymer thereon. A preferred method for making the first graft polymer is set forth below.

Suitable rubber cores onto which the interpolymer can be grafted include conjugated 1,3-diene rubbers, ethylene-propylene-diene terpolymer rubbers, acrylate-diene interpolymer rubbers and mixtures thereof. Preferably, the elastomeric cores are polymerized from a monovinylidene aromatic monomer, a conjugated diolefin, and an ethylenically unsaturated nitrile monomer, hereinafter "first generally hydrophobic monomer mixture".

The term "monovinylidene aromatic monomer" is intended to include those monomers wherein a radical of the formula

(wherein R is hydrogen or a lower alkyl such as an alkyl having from 1 to 4 carbon atoms) is attached directly to an aromatic nucleas containing from 6 to 10 carbon atoms, including those wherein the aromatic nucleas is substituted with alkyl or halogen substituents. Exemplary of monovinylidene aromatic monomers are styrene; alpha-alkyl monovinylidene monoaromatic compounds (e.g., alpha-methylstyrene, alpha-ethylstyrene, alpha-methylvinyltoluene, alpha-methyl dialkylstyrenes, etc.); ring-substituted alkyl styrenes (e.g., ortho-, meta-, and paravinyl toluene, o-ethylstyrene, p-ethylstyrene, 2,4-dimethylstyrene, p-tertiarybutylstyrene, etc.); ring-substituted halostyrenes (e.g., o-chlorostyrene, p-chlorostyrene, o-bromostyrene, 2,4-dichlorostyrene, etc.); ring-alkyl, ring-halo-substituted styrenes (e.g., 2-chloro-4-methylstyrene, 2,6-dichloro-4-methylstyrene, etc.); vinyl naphthalene; vinylanthracene; etc. The alkyl substituents generally have one to four carbon atoms and may include isopropyl and isobutyl groups. If desired, mixtures of one or more such monovinylidene aromatic monomers may be used.

Because of considerations such as cost, availability, ease of use, etc., styrene is the preferred monovinylidene aromatic monomer. The monovinylidene aromatic monomer constitutes from about 0 to about 40, preferably from about 0 to about 15 weight percent of the first generally hydrophobic monomer mixtures.

The term "conjugated diolefin" is meant to include 1,3-butadiene; 2-methyl-1,3-butadiene; 1,3-dimethyl-1,3- butadiene; pentadiene; 2-neopentyl-1,3-butadiene; and other hydrocarbon analogs of 1,3-butadiene; and, in addition, the substituted 1,3-butadienes, such as 2-chloro-1,3-butadiene; 2-cyano-1,3-butadiene the substituted straight chain conjugated pentadienes; the straight chain and branch chain conjugated hexadienes; other straight and branched chain conjugated dienes having from about 4 to about 9 carbon atoms, and comonomeric mixtures thereof.

The cost, ready availability, and excellent properties of interpolymers produced therefrom, makes 1,3-butadiene the most preferred conjugated diolefin for use in the present invention. The conjugated diolefin constitutes from about 50 to about 100, preferably, from about 70 to about 100, and most preferably from about 85 to about 96 weight percent of the first generally hydrophobic monomer mixture.

The term "ethylenically unsaturated nitrile monomer" is meant to include, acrylonitrile, methacrylonitrile, ethacrylonitrile and the like, and mixtures thereof. The ethylenically unsaturated nitrile monomer is present in an amount of from about 0 to about 15 weight percent, preferably from about 0 to about 5 weight percent of the first generally hydrophobic monomer mixtures. The cost and ready availability make acrylonitrile the most preferred ethylenically unsaturated nitrile monomer for use in the present invention.

The monomers of the first generally hydrophobic monomer mixture are emulsified in water with the aid of a micelle-forming emulsifying agent. The resultant aqueous suspension usually contains a suitable water-soluble, free radical generating initiator such as a peroxide or a persulfate. Additionally, a modifier or regulator, such as a mercaptan, may be present in small amounts. The modifier acts as a chain transfer agent and limits the growth of the polymer chain.

Suitable emulsifying agents which can be employed in the practice of the present invention include anionic, cationic and nonionic emulsifiers customarily used in emulsion polymerization. Usually at least one anionic emulsifier is included and one or more nonionic emulsifiers can also be present.

Representative types of anionic emulsifiers are the alkylaryl sulfonates, alkali metal alkyl sulfates, the sulfonated alkyl esters, the fatty acid soaps and the like. Specific examples of these well-known emulsifiers include dodecylbenzene sodium sulfonate, sodium butylnapthalene sulfonate, sodium lauryl sulfate, disodium dodecyl diphenyl ether disulfonate, N-octadecyl disodium sulfosuccinate, and dioctyl sodium sulfosuccinate.

The emulsifying agents can be employed in varying amounts so long as adequate emulsification is achieved to provide graftable rubber substrates of the desired size and size distribution. As a general rule, the emulsifying agents are present in an amount of from about 0.02 to 6.0 weight percent, preferably from about 0.4 to about 4.0 weight percent, based on total monomer to be polymerized.

Molecular weight modifiers may be employed in the polymerization step of the present invention. The molecular weight modifiers are present in an amount of from 0% to about 5.0% by weight, preferably from about 0.1 to about 1.0% by weight, based upon the total weight of monomer to be polymerized.

Suitable molecular weight modifiers include n-octyl mercaptan, cyclohexyl mercaptan, dipentene dimercaptan, n-butyl mercaptan, n-dodecyl mercaptan, tertiary dodecyl mercaptan, isooctyl thioglycolate, penanyl mercaptan, pentaerithritoltetra (3-mercapto-propionate), ethyl cyclohexyl dimercaptan, allyl bromide, carbontetrachloride, bromotrichloromethane, and betabromostyrene. Other suitable molecular modifiers include: methyl mercaptan, ethyl mercaptan, 1-propyl mercaptan, 2-propyl mercaptan, 1-butyl mercaptan, 2-butyl mercaptan, 1-pentyl mercaptan, 2-pentyl mercaptan, 3-pentyl mercaptan, 1-hexyl mercaptan, 1-heptyl mercaptan, tertiary nonyl mercaptan, n-decyl mercaptan, secondary undecyl mercaptan, secondary dodecyl mercaptan and terpenes such as terpinolene and limonene and mixtures of the foregoing regulators.

Suitable free-radical generating initiators or catalysts include water-soluble persulfate or peroxy compounds and water-soluble redox systems, preferably potassium, sodium, or ammonium peroxydisulfate, or hydrogen peroxide, in combination with a reducing agent, such as sodium metabisulphite, sodium thiosulfate, sodium bisulfite, sodium formaldehyde sulfoxylate, sodium dithionite, sodium hypophosphite, ferrous sulfate, ferrous nitrate, and water-soluble amines, for example, triethylamine and triethanolamine, which act as an accelerator. The preferred water-soluble persulfate compound is sodium or potassium persulfate. Oil soluble initiators such as cumene hydroperoxide, azobisisobutyronitrile, tertiary butyl hydroperoxide, paramethane hydroperoxide; benzoyl peroxide and the like may be used.

The amount of free-radical generating initiator or catalyst used is within the limits considered normal for polymerization reactions of this type, i.e., between 0.01 and 5 weight percent, preferably from about 0.02 to about 2.0 weight percent based on the total monomer to be polymerized.

Finally, the first generally hydrophobic monomer mixture may contain other modifiers, including plasticizers, stabilizers, lubricants, dyes, pigments, and fillers, provided they do not chemically react with or otherwise adversely affect the ingredients of the first or second generally hydrophobic monomer mixtures.

In a preferred embodiment, an amount of hydrophillic monomer is added to the aqueous suspension. Suitable hydrophillic monomers include: acrylonitrile, methacrylonitrile, and methyl methacrylate. The preferred hydrophillic monomer is acrylonitrile.

The hydrophillic monomer is added in an amount sufficient to provide a generally hydrophillic surface on a polymer to be prepared from the monomers present in the aqueous suspension. Suitable, the hydrophillic monomer is added in an amount of from about 0.1 to about 5 weight percent based on total weight of the aqueous phase and the first generally hydrophobic monomer mixture. In one preferred embodiment of the present invention wherein the hydrophillic monomer is acrylonitrile, the acrylonitrile is present in an amount of from about 0.2 to about 2.3 weight percent based on total weight of the aqueous phase and the first generally hydrophobic monomer mixture.

Polymerization of the monomers present in the aqueous suspension is then initiated to form an aqueous suspension of partially polymerized monomers. Polymerization is carried out under suitable conditions such as, for example, from about 0° C. to about 120° C., preferably from about 50° C. to about 110° C. and autogenous pressure. The aqueous suspension of partially polymerized monomers may be stabilized and stored for future use, or they may be used immediately in forming the graftable rubber substrates.

A second generally hydrophobic monomer mixture is provided. The second generally hydrophobic monomer mixture comprises a monovinylidene aromatic monomer, a conjugated diolefin, and an ethylenically unsaturated nitrile monomer.

The monovinylidene aromatic monomers suitable for use in the second generally hydrophobic monomer mixture are the same as those hereinbefore set forth as suitable for use in the first generally hydrophobic monomer mixture. The conjugated diolefins suitable for use in the second generally hydrophobic monomer mixture are the same as those hereinbefore set forth as suitable for use in the first generally hydrophobic monomer mixture. The ethylenically unsaturated nitrile monomers suitable for use in the second generally hydrophobic monomer mixture are the same as those hereinbefore set forth as suitable for use in the first generally hydrophobic monomer mixture.

The monovinylidene aromatic monomer is present in the second generally hydrophobic monomer mixture in an amount of from about 0 to about 40, preferably from about 0 to about 15 weight percent based on total weight of the second generally hydrophobic monomer mixture. The conjugated diolefin monomer mixture in an amount of from about 50 to about 100, preferably from about 70 to about 100, and most preferably from about 85 to about 96 weight percent based on total weight of the second generally hydrophobic monomer mixture. The conjugated diolefin monomer mixture in an amount of from about 50 to about 100, preferably from about 70 to about 100, and most preferably from about 85 to about 96 weight percent based on total weight of the second generally hydrophobic monomer mixture. The ethylenically unsaturated nitrile monomer is present in the second generally hydrophobic monomer mixture in an amount of from about 0 to about 15, preferably from about 0 to about 5 weight percent based on total weight of the second generally hydrophobic monomer mixture.

Additionally, the second generally hydrophobic monomer mixture may contain additives, e.g., free radical generating catalysts or initiators, molecular weight modifiers or regulators, and the like, as hereinbefore set forth as suitable for inclusion in the first generally hydrophobic monomer mixture.

The second generally hydrophobic monomer mixture is added to the aqueous suspension of partially polymerized monomers. For ease of controlling the polymerization rate, it is preferred that the second generally hydrophobic monomer mixture be added to the aqueous suspension of partially polymerized monomers gradually over a length of time. The length of time over which the second generally hydrophobic monomer mixture is added to the aqueous suspension of partially polymerized monomers is suitably from about 1 to about 24 hours.

The first generally hydrophobic monomer mixture and the second generally hydrophobic monomer mixture can be nearly identical in composition. Preferably, the first generally hydrophobic monomer mixture represents from about 0 to about 25, more preferably from about 0 to about 15 weight percent of the total combined weight of the first and second generally hydrophobic monomer mixture.

Alternatively, a single generally hydrophobic monomer mixture is provided, said mixture comprising a monovinylidene aromatic monomer, a conjugated diolefin, and an ethylenically unsaturated nitrile monomer. The single generally hydrophobic monomer mixture is then divided into a first portion and a second portion, said first portion being the functional equivalent of the first generally hydrophobic monomer mixture, said second portion being the functional equivalent of the second generally hydrophobic monomer mixture.

In some embodiments of the present invention, the first and/or second generally hydrophobic monomer mixtures contain seed particles. The use of such seed particles is well-known by those skilled in the art. The seed particles allow for more precise control of the particle size of the graftable rubber substrate. Typically, such seed particles have a diameter of about 500 Å or less and comprise any material capable of nucleating the formation of the graftable rubber substrates with the further limitation that the material comprising the seed particle not chemically interfere with the reaction used to form the graftable rubber substrates.

The graftable rubber substrate is prepared by continuing polymerization of the monomers present in the aqueous suspension of the partially polymerized monomers until achieving a conversion of monomer to polymer of at least 50%. The unreacted monomers, optionally, may be removed from the aqueous suspension of partially polymerized monomers prior to the graft polymerization step by any of the conventional monomer removal methods. The graftable rubber substrates preferably have diameters ranging in size from about 300 to about 5000, preferably from about 800 to about 2000 Å; the foregoing values being volume average values.

This method of forming the graftable rubber substrate is preferred because it is quick and efficient and produces a graftable rubber substrate capable of having grafted thereto a substantially continuous, generally uniform layer of superstrate. However, it is understood that any method of forming a graftable rubber substrate is suitable for use in the present invention. Those methods of forming a graftable rubber substrate capable of having grafted thereto a substantially continuous, generally uniform layer of superstrate are preferred.

The graftable rubber substrates are then subjected to a graft polymerization step wherein a superstrate of an interpolymer which is preferably substantially continuous is grafted to the graftable rubber substrate. The interpolymer graft to the graftable rubber substrate is polymerized from a monomer mixture comprising a monovinylidene aromatic monomer and one or more monomers copolymerizable therewith.

The monovinylidene aromatic monomers suitable for graft polymerization to the graftable rubber substrates are the same as those hereinbefore described as being suitable for inclusion in the first generally hydrophobic monomer mixture. The monomers copolymerizable with the monovinylidene aromatic monomers include the ethylenically unsaturated nitrile monomers and the monoethylenically unsaturated esters of carboxylic acid monomers.

Exemplary of the ethylenically unsaturated nitrile monomers suitable for copolymerization with the monovinylidene aromatic monomers are the ethylenically unsaturated nitrile monomers hereinbefore described as being suitable for inclusion in the first generally hydrophobic monomer mixture. The preferred ethylenically unsaturated nitrile monomer is acrylonitrile.

Exemplary of the ethylenically unsaturated esters of carboxylic acid monomers suitable for copolymerization with the monovinylidene aromatic monomers are methylacrylate, methyl methacrylate, ethylacrylate, ethyl methacrylate, 2-chloroethyl methacrylate, propyl acrylate or methacrylate, n-butyl acrylate or methacrylate, 2-ethyl hexyl acrylate, and the like. For reasons of cost and ease of use of the preferred ethylenically unsaturated carboxylic acid monomer is methyl methacrylate.

The graftable rubber substrates are grafted with the interpolymer by techniques well known in the art. Typically, the monomers from which the interpolymer is polymerized are polymerized in the presence of an emulsion of the graftable rubber substrates.

In one preferred embodiment, the graft polymerization process in which the interpolymer is grafted to the graftable rubber substrate is allowed to continue until the graftable rubber substrate has grafted thereto from about $0.7 \times 10^{-7}$ to about $20.0 \times 10^{-7}$ gram of interpolymer per square centimeter of graftable rubber substrate surface. Preferably, the graft polymerization process is allowed to continue until from about $0.7 \times 10^{-7}$ to about $7.0 \times 10^{-7}$ gram of interpolymer per square centimeter of graftable rubber substrate surface has been graft polymerized onto the graftable rubber substrate.

The Low Graft Copolymer

The second graft copolymer can be prepared in the same manner and from the same materials as those used to produce the first graft copolymer. However, the second graft copolymer has a relatively lower amount of interpolymer grafted to the graftable rubber substrate than the high graft copolymer. In all instances, the amount of superstrate grafted to the graftable rubber substrate of the low graft copolymer is less than the amount of superstrate grafted to the graftable rubber substrate of the first graft copolymer.

In forming the second graft copolymer, the graft polymerization step is suitably allowed to continue until from about 0 to about $3.0 \times 10^7$ gram of interpolymer per square centimeter of graftable rubber substrate surface has been graft polymerized onto the graftable rubber substrate. Preferably, the low graft copolymer has an amount of superstrate grafted to the graftable rubber substrate which amount is less than ⅔ of the amount of superstrate grafted to the graftable rubber substrate of the high graft copolymer.

The Blend

The latexes of first and second graft copolymers are blended in a manner to be well mixed. This can be accomplished in any conventional manner by combining the latexes in a conventional mixing apparatus. The mixture of latexes is then coagulated and dewatered using any conventional means, for example, by freeze coagulation, chemical coagulation or by shear coagulation and mechanical dewatering as disclosed in U.S. Pat. No. 4,299,952, Nov. 10, 1981 to Pingel, et al. Preferably, latex solids are recovered by a freeze coagulation process. If the coagulant is stringy or rubbery, the latexes can be diluted before coagulation or the coagulant can be shredded for easier handling.

First Melt Blend

The recovered latex solids are then melt blended. By the term "melt blended" is meant a process wherein the particles are subjected to mechanical shear while in a heat plastified state. This step can be carried out by, for example, extrusion or roll milling with heating. Suitable apparatus for carrying out this step is well known in the art for compounding plastics and includes, for example, double screw extruders or sigma blade mixers. The rubber composition of the recovered latexes which are melt blended should be from about 40% to about 80%. Preferably, the recovered latexes have high rubber cross link density corresponding to a swell index of 12 or less.

Second Melt Blend With The Matirix

The product of the first melt blend is then melt blended with a matrix interpolymer to a final rubber content of from about 5% to about 30%.

The matrix of the present invention consists mainly of an interpolymer of a monovinylidene aromatic monomer and one or more monomers copolymerizable therewith. The matrix generally comprises at least about 60%, preferably about 80%, and more preferably about 96% by weight, based on total matrix weight of the interpolymer.

When the matrix does not comprise 100 weight percent of the interpolymer, the balance of the matrix can comprise (1) additional polymeric materials; and/or (2) other filler-type material combined with the interpolymer of the matrix, e.g., plasticizers, lubricants, pigments, fillers, flame retardants, etc.

Suitable monovinylidene aromatic monomers include those set forth above with regard to the first generally hydrophobic monomer mixtures. Exemplary of the monomers copolymerizable with the monovinylidene aromatic monomers are the unsaturated nitriles. Suitable unsaturated nitriles are acrylonitrile, methacrylonitrile, ethacrylonitrile, and mixtures thereof. The unsaturated nitrile is generally present in the interpolymer of the matrix in an amount of from about 5 to about 50, preferably, from about 15 to about 35 weight percent based on total weight of the interpolymer of the matrix.

Other monomers copolymerizable with the monovinylidene aromatic monomer and suitable for use in the interpolymer of the matrix are the conjugated 1,3-dienes (e.g., butadiene, isoprene, etc.); alpha- or beta-unsaturated monobasic acids and derivatives thereof (e.g., acrylic acid, methyl acrylic acid, ethyl acrylate, butyl acrylate, 2-ethylhexyl acrylate, methacrylic acid, and the corresponding esters thereof such as methyl methacrylate, etc., acrylamide, methacrylamide); vinyl halides such as vinyl chloride, vinyl bromide, etc.; vinylidene chloride, vinylidene bromide, etc.; vinyl esters such as vinyl acetate, vinylpropionate, etc.; dialkyl maleates or fumerates such as dimethyl maleate, diethyl maleate, dibutyl maleate, the corresponding fumarates, etc.

The preferred monomers copolymerizable with the monovinylidene aromatic monomer of the interpolymer of the matrix are acrylonitrile and methyl methacrylate.

The interpolymer of the matrix and the interpolymer graft to the first and second graft copolymers may have the same or different composition. If the interpolymers have different compositions, they must be compatible. For the purposes of this invention, the interpolymer of the matrix and the interpolymer graft to the high and low graft copolymers are considered compatible if, assuming different glass transition temperatures, a blend of the interpolymers would displace the glass transition temperature of the interpolymer of the matrix. Preferentially, a blend of the interpolymer graft to the high and low graft copolymers and a compatible interpolymer of the matrix exhibits a single glass transition temperature.

Techniques suitable for producing the interpolymers of the matrix are well-known in the art. Examples of the known polymerization processes include mass, mass-solution, mass suspension, suspension, and emulsion polymerization processes as well as other modifications and/or combinations of such processes. See, for example, U.S. Pat. Nos. 3,509,237, Apr. 28, 1970 to Aubrey; 3,928,494, Dec. 23, 1975 to Aliberti; 4,221,883, Sept. 9, 1980 to Mott, et al.; 4,239,863, Dec. 16, 1980 to Bredewig; 4,243,765, Jan. 6, 1981 to Keskkula, et al.; and 4,250,271, Feb. 10, 1981 to Morris, et al. which are incorporated herein by reference and teach such processes.

The interpolymer of the matrix may be produced in a reaction separate from the production of the high and low graft copolymers or, as is well-known in the art, all or part of the interpolymer of the matrix can be formed in the reaction used to produce the high and low graft copolymers. In most instances, the reaction used to produce the high and low graft copolymers inherently produces at least a small amount of the interpolymer of the matrix.

Further understanding of the present invention will be had from the following examples. The first two examples employ the same graftable rubber substrate which was prepared as set forth below.

A 200 gallon glass-lined jacketed reactor was charged with 445.39 kilograms of deionized water, 1332.97 grams of a 43% solution of sodium dodecylbenzenesulfonate, 318.13 grams of sodium bicarbonate, and 203.60 grams of a 46% solution of ethylene diamine tetraacetic acid. The reactor was sealed and tested for leaks at 30° C. The reactor was purged of oxygen by pressurizing said reactor with nitrogen to about 60 psig and then evacuating the nitrogen to a vacuum of about 150 millimeters of mercury. The process of pressurizing the reactor with nitrogen and evacuating was performed a total of three times.

After purging the reactor of oxygen, 4.63 kilograms of acrylonitrile were added to the reactor. Immediately after the addition of the acrylonitrile, 47.86 kilograms of a monomer mixture were added to the reactor. The monomer mixture comprised 4.9 parts styrene, 0.3 parts normal octyl mercaptan, 2.1 parts acrylonitrile, and 93.0 parts butadiene, all parts being per hundred parts monomer. To the reactor was then added an initiator shot comprising 636.26 grams of sodium persulfate dissolved in 636.26 grams of deionized water. The temperature of the reactor was increased to approximately 65° C. over a period of about one-half hour. A pressure drop of about 10 psig indicated initiation of the polymerization reaction. At this time, 271.45 kilograms of a monomer mixture were continuously added to the reactor at a rate of about 54.29 kilograms per hour. The monomer mixture comprised 4.9 parts styrene, 0.3N-octyl mercaptan, 2.1 parts acrylonitrile and 93 parts butadiene, all parts being per one hundred parts monomer. At the same time the monomer mixture was being continuously added to the reactor, an aqueous mixture was being added to the reactor. The aqueous mixture was added to the reactor at a rate of about 13.07 kilograms per hour until 78.42 kilograms of the aqueous mixture had been added to the reactor at a rate of about 54.29 kilograms per hour. The monomer mixture comprised 4.9 parts styrene, 0.3N-octyl mercaptan, 2.1 parts acrylonitrile and 93 parts butadiene, all parts being per one hundred parts monomer.

The reaction was allowed to continue until the butadiene pressure within the reactor decreased to about 20 psig. At this time, the contents of the reactor were steam stripped to remove the unreacted monomer. The monodisperse rubber substrate particles had a volumetric means particle size of 1103 Å.

EXAMPLE I

The latex of graftable rubber substrate produced in the above-described manner was then grafted. To a 200 gallon glass-lined reactor was added 1064.623 lbs. of the graftable rubber substrate latex produced above. The latex of graftable rubber substrate had a solids content of 35.9 percent by weight. The reactor was pressurized to 10 psig with nitrogen and heated to about 70° C.

To the reactor was then added 12.35 kilograms of a first monomer feed stream. The first monomer feed stream comprised 69.2 weight percent styrene, 30.8 weight percent acrylonitrile, based on total weight of the first monomer feed stream, and 0.340 parts per one hundred parts monomer of normal octyl mercaptan. The first monomer feed stream was continuously added to the reactor at a rate of about 78.64 lbs. per hour for 4 hours. At the same time the first monomer feed stream was being continuously added to the reactor, an aqueous feed stream was being added to the reactor. The aqueous feed stream was added to the reactor at a rate of about 85.5 lbs. per hour for 4 hours. The aqueous feed stream comprised 341.708 lbs. deionized water and 0.301 lbs. of sodium persulfate. During the reaction, samples were taken from the reactor, graft to rubber ratio measured by a solution method and feed rate adjusted as follows:

| Sample Size | Time of Sample | Feed Rate After Sample | Graft Ratio of Sample | % Rubber |
|---|---|---|---|---|
| 70 lbs. | 20 min. | 74.8 lb/hr. | | |
| 140 lbs. | 30 min. | 68.6 lb/hr. | 0.097 | 79.6 |
| 70 lbs. | 40 min. | 65.4 lb/hr. | | |
| 35 lbs. | 60 min. | 63.9 lb/hr. | | |
| 35 lbs. | 120 min. | 62.3 lb/hr. | | |
| 35 lbs. | 180 min. | 60.7 lb/hr. | | |
| 35 lbs. | 240 min. | 60.7 lb/hr. | 0.829 | 50.6 |

After the first monomer feed stream and aqueous feed stream had been added to the reactor, the reaction was allowed to continue for one hour at 70° C. Then a post added shot of 6.270 lbs. antifoam FG10 and 12.540 lbs. of deionized water were added to the reactor. The latex removed from the reactor was steam stripped of residual monomers and stabilized.

The 30 minute sample latex and 240 minute sample latex were blended in a 60:40 weight ratio. Then latex solids were recovered from the mixture by freeze coagulation by freezing and thawing in 1 gallon disposable polyethylene containers. The coagulated samples were centrifuged in a lab batch centrifuge and washed with about an equal volume of water and air dried overnight at room temperature. The product was determined to have a rubber content of 65.2%. One sample of product was extruded through a Welding Engineer's 8″ double screw (W/E) extruder at 150-200 rpm with 20-30 amps. The following temperature profile was followed:

| Zone | 1 | 2 | 3 | 4 | 5 | 6 |
|---|---|---|---|---|---|---|
| Temp °C. | 182 | 185 | 188 | 191 | 193 | 193 |

The extruded pellets were blended with styrene-acrylonitrile copolymer (SAN) in an inflated plastic bag to a rubber level of 20.1% and again extruded at 210 rpm and 20 amps.

| Zone | 1 | 2 | 3 | 4 | 5 | 6 |
|---|---|---|---|---|---|---|
| Temp °C. | 193 | 196 | 199 | 201 | 203 | 203 |

The SAN had the following properties:

| Vinyl Cyanide Content | Melt Flow ASTM "I" | Target Weight Ave Molecular Wt. |
|---|---|---|
| 30.0–32.0% | 21.29 | 115,000 g/mole |

The extruded pellets were injection molded on a Negri Bossi model VT-9FA injection molder under the following temperature conditions:

| Rear Cylinder | Front Cylinder | Mold |
|---|---|---|
| 375° F. | 400° F. | 80° F. |

Gloss was measured in percent reflected light by a 60° glass meter. Notched bars were broken in the Izod impact test and melt flow rate was measured on extruded pellets at ASTM condition "I" (227° C., 3700 g wt.). The test results were:

| % Gloss | IZOD ft-lb/in. | MFR |
|---|---|---|
| 89% | 5.2 | 3.3 |

Another sample of powder was blended with SAN to 20.4% rubber and extruded. The extruded pellets were then extruded again. The pellets were then injection molded into bars and disks whose properties were measured as above with the following results:

| % Gloss | IZOD ft-lb/in. | MFR |
|---|---|---|
| 51% | 4.6 | 2.7 |

EXAMPLE II

The procedures of Example I were followed in several runs using a 3500 gallon reactor with reactants and ratios of reactants as in Example I except that the amount of normal octyl mercaptan present during the graft reaction was varied to obtain grafted copolymers with varying swell indexes. The high and low graft copolymers first blended as latexes were then melt blended neat following the procedures of Example I then again melt blended with sufficient SAN added to give about 20% butadiene product after extrusion. The following results were obtained:

|  | High Graft | | Low Graft Time | | | Blended Sample | | | | |
|---|---|---|---|---|---|---|---|---|---|---|
| Sample | G/R | S.I. | (Min.) | G/R | S.I. | PAG | BUTA | Gloss | Izod | MFR |
| 93A | .86 | 28.1 | 120 | .143 | 28.1 | 55 | 20.4 | 84.8 | 6.77 | 2.25 |
| 93B | .86 | 28.1 | 120 | .143 | 28.1 | 70 | 20.7 | 83.1 | 6.00 | 2.49 |
| 93C | .91 | 14.7 | 120 | .123 | 14.7 | 55 | 20.5 | 83.1 | 7.30 | 1.84 |
| 93D | .91 | 14.7 | 120 | .123 | 14.7 | 70 | 20.2 | 73.9 | 7.90 | 1.84 | where:
G/R = graft ratio of superstrate to rubber
S.I. = swell index
Time (min.) = time in minutes after grafting reaction began that sample was taken from reactor
PAG = percent agglomerating latex, i.e. blend ratio as weight percent of the low graft latex per total latex
BUTA = butadiene content in percent
Gloss = gloss measured in percent reflected light by a 60° gloss meter
Izod = izod impact test results in ft-lb/in.
MFR = melt flow rate at ASTM condition "I" (227° C., 3700 g wt.)

EXAMPLE III

The procedures of Example II were followed except the amount of SAN melt blended with the neat extruded high graft and low graft blend was increased with the following results:

|  | High Graft | | Low Graft Time | | | Blended Sample | | | | |
|---|---|---|---|---|---|---|---|---|---|---|
| Sample | G/R | S.I. | (Min.) | G/R | S.I. | PAG | BUTA | Gloss | Izod | MFR |
| 93A | .86 | 28.1 | 120 | .143 | 28.1 | 55 | 20.4 | 84.8 | 6.77 | 2.25 |
| 99BN | .86 | 28.1 | 120 | .143 | 28.1 | 50 | 18.7 | 89.1 | 4.85 | 2.65 |

EXAMPLE IV

Each of the blended samples of Example II was compared with the same sample which had been re-extruded three times to demonstration the stability of the samples. All samples were "pre-extruded neat" and then adjusted to 20% butadiene on the first additional extrusion.

| SAMPLE | Times Extended | PAG | Gloss | Izod | MFR |
|---|---|---|---|---|---|
| 93A | 1 | 55 | 84.8 | 6.77 | 2.25 |
| 93A | 3 | 55 | 88.7 | 6.41 | 2.30 |
| 93B | 1 | 70 | 83.1 | 6.00 | 2.49 |
| 93B | 3 | 70 | 86.2 | 6.19 | 1.86 |
| 93C | 1 | 55 | 83.1 | 7.30 | 1.84 |
| 93C | 3 | 55 | 85.6 | 6.31 | 1.31 |
| 93D | 1 | 70 | 73.9 | 7.90 | 1.84 |
| 93D | 3 | 70 | 73.9 | 8.01 | 1.47 |

What is claimed is:

1. A process for preparing a polyblend of a high graft copolymer of a graftable rubber substrate and an interpolymer superstrate, a low graft copolymer of a graftable rubber substrate and an interpolymer superstrate, and a matrix interpolymer, said graftable rubber substrate comprising a rubber core selected from the group consisting of conjugated 1,3-diene rubbers, ethylene-propylene-diene terpolymer rubbers, acrylate-diene interpolymer rubbers and mixtures thereof, each of said interpolymer superstrate and matrix interpolymer comprising an interpolymer of a monovinylidene aromatic monomer and one or more monomers copolymerizable therewith, said low graft copolymer having an amount of superstrate in grams of superstrate per square centimeter of graftable rubber substrate of less than ⅔ of the amount of superstrate of said high graft copolymer, said process comprising the sequential steps of:

(A) mixing a latex of the high graft copolymer and a latex of the low graft copolymer to provide a mixture thereof;
(B) coagulating and at least partially dewatering the mixture of step (A);
(C) melt blending the mixture of step (B) to provide a first polyblend; and
(D) melt blending the first polyblend of step (C) with matrix interpolymer to provide a second polyblend.

2. The process of claim 1 wherein said high graft copolymer and said low graft copolymer comprise a core of a polymerization product of a monovinylidene aromatic monomer, a conjugated diolefin and an ethylenically unsaturated nitrile monomer and an interpolymer of a polymerization product of a monovinylidene aromatic monomer and a monomer copolymerizable therewith.

3. The process of claim 1 wherein said high graft copolymer has from about $0.7 \times 10^{-7}$ to about $20 \times 10^{-7}$ grams of superstrate per square centimeter of graftable rubber substrate and said low graft polymer has from about 0 to about $3.0 \times 10^{-7}$ grams of superstrate per square centimeter of graftable rubber substrate.

4. The process of claim 3 wherein said high graft copolymer has from about $0.7 \times 10^{-7}$ to about $7.0 \times 10^{-7}$ grams of superstrate per square centimeter of graftable rubber substrate.

5. The process of claim 1 wherein step (B) is carried out by freeze coagulating.

6. The process of claim 1 wherein step (C) is carried out by extruding.

7. The process of claim 1 wherein the product of step (B) has a rubber content of from about 40% to about 80%.

8. The process of claim 7 wherein said matrix interpolymer is blended in an amount to provide a product having a rubber content of from about 5% to about 30%.

9. The process of claim 1 wherein said high graft copolymer and low graft copolymer each comprise a conjugated diolefin substrate having grafted thereon the reaction product of a monovinylidene monomer and an ethylenically unsaturated nitrile monomer.

10. The process of claim 9 wherein said conjugated diolefin is 1,3-butadiene, said monovinylidene monomer is styrene and said ethylenically unsaturated nitrile monomer is acrylonitrile.

11. The process of claim 4 wherein step (B) is carried out by freeze coagulating and step (C) is carried out by extruding.

12. The process of claim 4 wherein the product of step (B) has a rubber content of from about 40% to about 80%.

13. The process of claim 12 wherein said matrix interpolymer is blended in an amount to provide a product having a rubber content of from about 5% to about 30%.

14. The process of claim 13 wherein said high graft copolymer and said low graft copolymer each comprise a conjugated diolefin substrate having grafted thereon the reaction product of ethylenically unsaturated nitrile monomer.

15. The process of claim 14 wherein said conjugated diolefin is 1,3-butadiene, said monovinylidene monomer is styrene and said unsaturated nitrile monomer is acrylonitrile.

16. A polyblend product made by the process of claim 1.

17. A polyblend product made by the process of claim 15.

18. A process for preparing a polyblend of high graft and low graft copolymers, each of a 1,3-butadiene substrate having a polymerization product superstrate of styrene and acrylonitrile grafted thereon, said low graft copolymer having from about 0 to about $3.0 \times 10^{-7}$ grams of superstrate per square centimeter of substrate and having less than ⅔ of the amount of superstrate per square centimeter of substrate of said high graft copolymer, said high graft copolymer having from about $0.7 \times 10^{-7}$ to about $7.0 \times 10^{-7}$ grams of superstrate per square centimeter of substrate, said process comprising the sequential steps of:

(A) mixing a latex of said high graft copolymer and a latex of said low graft copolymer to provide a first mixture, said mixture having a 1,3-butadiene content of from about 40% to about 80%,
(B) freeze coagulating and at least partially dewatering said first mixture to provide a second mixture;
(C) melt blending said second mixture to provide a first polyblend;
(D) melt blending said first polyblend with a matrix interpolymer of styrene and acrylonitrile in an amount sufficient to provide a second polyblend having a 1,3-butadiene content of from about 5% to about 30%.

* * * * *

UNITED STATES PATENT AND TRADEMARK OFFICE
CERTIFICATE OF CORRECTION

PATENT NO. : 4,740,560
DATED : April 26, 1988
INVENTOR(S) : Eugene R. Moore, Gary D. Parsons and Paul C. Balliet It is certified that error appears in the above-identified patent and that said Letters Patent is hereby corrected as shown below:

First page, under U.S. PATENT DOCUMENTS, Patent No. "3,509,258" is incorrect, the Patent No. should read --3,509,238--.

Column 2, line 7, "tha" should read --that--.

Column 2, line 41, "nucleas" should read --nucleus--.

Column 2, line 42, "nucleas" should read --nucleus--.

Column 9, line 52, "0.3N-octyl" should read --0.3 N-octyl--.

Column 9, line 62, "0.3N-octyl" should read --0.3 N-octyl--.

Column 10, line 2, "means" should read --mean--.

Column 12, line 49, "demonstration" should read --demonstrate--.

Signed and Sealed this

Thirty-first Day of January, 1989

Attest:

DONALD J. QUIGG

Attesting Officer     Commissioner of Patents and Trademarks